(12) United States Patent
Shi et al.

(10) Patent No.: US 12,414,130 B2
(45) Date of Patent: Sep. 9, 2025

(54) RESOURCE DETERMINATION IN WIRELESS COMMUNICATIONS

(71) Applicant: ZTE Corporation, Guangdong (CN)

(72) Inventors: Jing Shi, Shenzhen (CN); Peng Hao, Shenzhen (CN); Xingguang Wei, Shenzhen (CN); Wei Gou, Shenzhen (CN); Xing Liu, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 432 days.

(21) Appl. No.: 17/986,555

(22) Filed: Nov. 14, 2022

(65) Prior Publication Data

US 2023/0077644 A1 Mar. 16, 2023

Related U.S. Application Data

(63) Continuation of application No. PCT/CN2020/090214, filed on May 14, 2020.

(51) Int. Cl.
*H04W 72/23* (2023.01)
*H04L 1/00* (2006.01)

(52) U.S. Cl.
CPC ........... *H04W 72/23* (2023.01); *H04L 1/0038* (2013.01)

(58) Field of Classification Search
CPC .................................................. H04W 72/23
USPC ......................................................... 370/329
See application file for complete search history.

(56) References Cited

U.S. PATENT DOCUMENTS

| 2013/0058240 | A1 | 3/2013 | Kim et al. |
| 2017/0055246 | A1 | 2/2017 | Tabet et al. |
| 2018/0006763 | A1 | 1/2018 | Kim et al. |
| 2019/0223164 | A1 | 7/2019 | He et al. |
| 2020/0280971 | A1* | 9/2020 | Moon .................... H04L 5/0053 |
| 2021/0058189 | A1 | 2/2021 | Xiao et al. |
| 2021/0314997 | A1* | 10/2021 | Seo ........................ H04L 5/0053 |

FOREIGN PATENT DOCUMENTS

| CN | 110138500 A | 8/2019 |
| CN | 110474737 A | 11/2019 |
| CN | 110475356 A | 11/2019 |

(Continued)

OTHER PUBLICATIONS

Communication Pursuant to Article 94(3) EPC for European Patent Application No. 20897234.9, mailed Sep. 4, 2024 (5 pages).

(Continued)

*Primary Examiner* — Peter G Solinsky
(74) *Attorney, Agent, or Firm* — Perkins Coie LLP

(57) ABSTRACT

The present application relates to methods, systems, and devices related to digital wireless communication, and more specifically, to techniques related to digital wireless communication, and more specifically, to techniques related to maintaining a PDCCH blind decoding budget in the case that a cell can be scheduled by another cell and by itself. In one exemplary aspect, a method for wireless communication is disclosed. The method includes receiving, by a terminal on a scheduling cell, control information for a first cell according to a rule that an amount of blind decoding resources for the first cell does not exceed a budget, wherein the first cell is scheduled by the scheduling cell and the first cell is also scheduled by itself.

14 Claims, 5 Drawing Sheets

300

RECEIVE, BY A TERMINAL ON A SCHEDULING CELL, CONTROL INFORMATION FOR A FIRST CELL ACCORDING TO A RULE THAT AN AMOUNT OF BLIND DECODING RESOURCES FOR THE FIRST CELL DOES NOT EXCEED A BUDGET, WHEREIN THE FIRST CELL IS SCHEDULED BY THE SCHEDULING CELL AND THE FIRST CELL IS ALSO SCHEDULED BY ITSELF

302

(56) References Cited

FOREIGN PATENT DOCUMENTS

| WO | 2019143164 A1 | 7/2019 |
|---|---|---|
| WO | 2020032693 A1 | 2/2020 |

OTHER PUBLICATIONS

Ericsson, "HARQ and scheduling enhancements for NR-U", 3GPP TSG-RAN WG1 #96bis, Xi'an, China, R1-1904337, 10 pages, Apr. 8-12, 2019.

CATT, "Triggering of SCell dormancy", 3GPP TSG RAN WG1 Meeting #98bis, Chongqing, China, R1-1910325, 5 pages, Oct. 14-20, 2019.

International Search Report and Written Opinion for International Application No. PCT/CN2020/090214, mailed on Feb. 18, 2021 (7 pages).

Office Action for Canadian Patent Application No. 3,183,448, mailed May 23, 2024 (6 pages).

Qualcomm Inc., "Maintenance for physical downlink control channel," 3GPP TSG RAN WG1 Meeting #94, R1-1809426, Gothenburg, Sweden, Aug. 20-Aug. 24, 2018 (15 pages).

Panasonic, "BD/CCE/Search space limit for search space sharing," 3GPP TSG RAN WG1 Meeting #95, R1-1813483, Spokane, USA, Nov. 12-16, 2018 (3 pages).

Extended European Search Report for European Patent Application No. 20897234.9, mailed Dec. 4, 2023 (12 pages).

Office Action for Chinese Patent Application No. 202080098796.2, mailed Nov. 29, 2024 (18 pages).

Office Action for Korean Patent Application No. 10-2022-7039813, mailed Apr. 1, 2025, with English summary (9 pages).

Communication under Rule 71(3) EPC for European Patent Application No. 20897234.9, mailed Mar. 20, 2025 (41 pages).

\* cited by examiner

RESOURCE DETERMINATION IN WIRELESS COMMUNICATIONS

CROSS REFERENCE TO RELATED APPLICATIONS

This patent document is a continuation of and claims benefit of priority to International Patent Application No. PCT/CN2020/090214, filed on May 14, 2020. The entire content of the before-mentioned patent application is incorporated by reference as part of the disclosure of this application.

TECHNICAL FIELD

This patent document is directed generally to wireless communications.

BACKGROUND

Mobile communication technologies are moving the world toward an increasingly connected and networked society. The rapid growth of mobile communications and advances in technology have led to greater demand for capacity and connectivity. Other aspects, such as energy consumption, device cost, spectral efficiency, and latency are also important to meeting the needs of various communication scenarios. Various techniques, including new ways to provide higher quality of service, are being discussed.

SUMMARY

This document discloses methods, systems, and devices related to digital wireless communication, and more specifically, to techniques related to maintaining a PDCCH blind decoding budget in the case that a cell can be scheduled by another cell and by itself.

In one exemplary aspect, a method for wireless communication is disclosed. The method includes receiving, by a terminal on a scheduling cell, control information for a first cell according to a rule that an amount of blind decoding resources for the first cell does not exceed a budget, wherein the first cell is scheduled by the scheduling cell and the first cell is also scheduled by itself.

In another exemplary aspect, a wireless communications apparatus comprising a processor is disclosed. The processor is configured to implement a method described herein.

In yet another exemplary aspect, the various techniques described herein may be embodied as processor-executable code and stored on a computer-readable program medium.

The details of one or more implementations are set forth in the accompanying attachments, the drawings, and the description below. Other features will be apparent from the description and drawings, and from the clauses.

DETAILED DESCRIPTION

Figure 1:
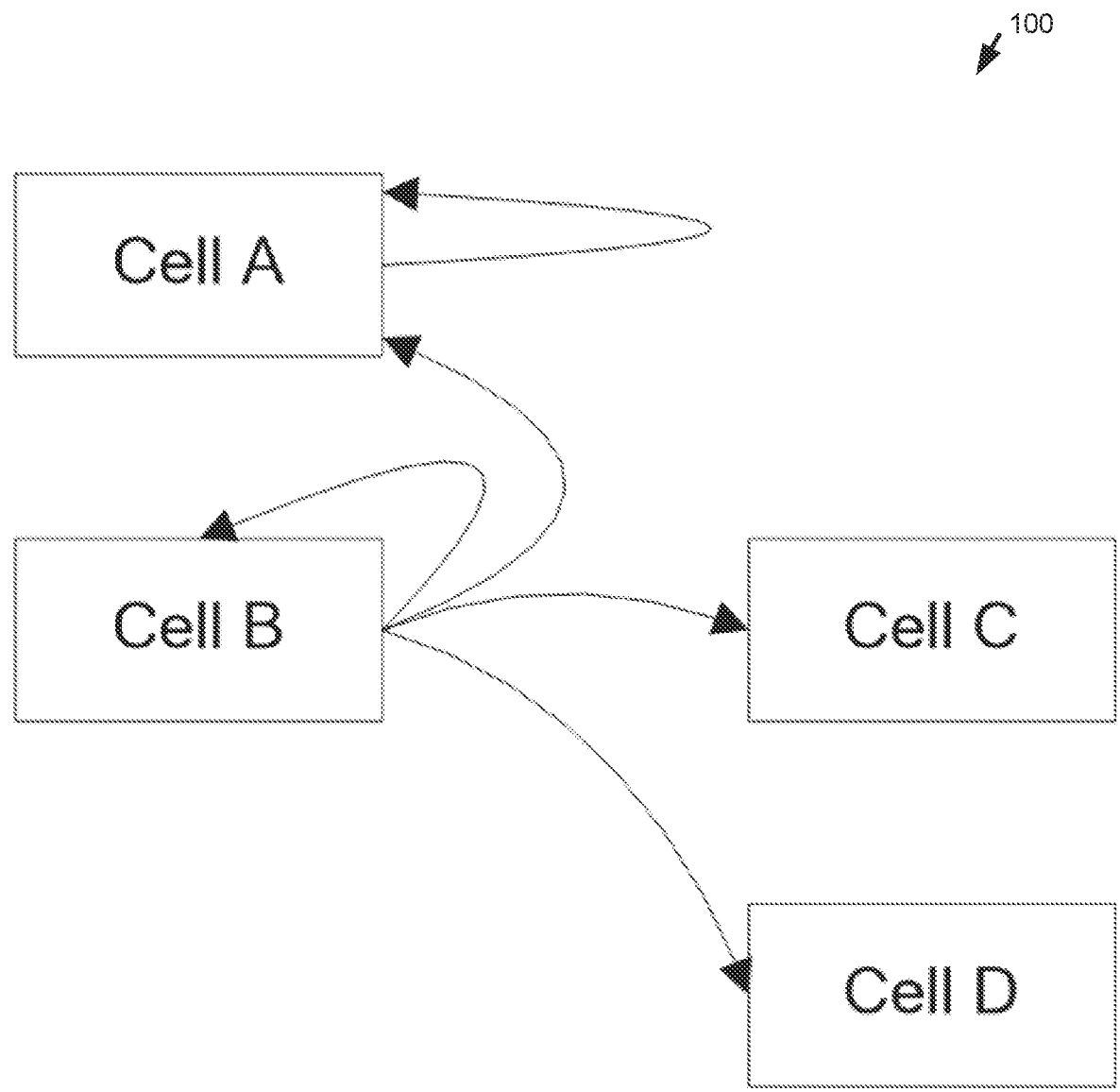
FIG. 1 illustrates a first example of CA scheduling.

The development of the new generation of wireless communication—5G New Radio (NR) communication—is a part of a continuous mobile broadband evolution process to meet the requirements of increasing network demand. NR will provide greater throughput to allow more users connected at the same time. Other aspects, such as energy consumption, device cost, spectral efficiency, and latency are also important to meeting the needs of various communication scenarios.

The 4th Generation mobile communication technology (4G) Long-Term Evolution (LTE) or LTE-Advance (LTE-A) and the 5th Generation mobile communication technology (5G) face more and more demands. Based on the current development trend, 4G and 5G systems are developing supports for features of enhanced mobile broadband (eMBB), ultra-reliable low-latency communication (URLLC), and massive machine-type communication (mMTC). Further, a spectrum used for 4G can be reused for 5G by dynamic spectrum sharing (DSS).

In current 5G systems, a SCell can be the only scheduling cell or scheduled cell, while the PCell (or SCell) may include a scheduling cell and may not be a scheduled cell. In the case that the PCell (or SCell) can be a scheduled cell, the total PDCCH blind decoding budget may not be changed. A scheduling cell is responsible for scheduling transmissions over the wireless medium both from the network and to the network.

For the 5th Generation mobile communication technology, a physical downlink control channel (PDCCH) of a primary cell PCell (or primary secondary cell group cell PSCell) can schedule a physical downlink shared channel (PDSCH) or a physical uplink shared channel (PUSCH) on a PSCell, but PDSCH or PUSCH on P(S)Cell may not be scheduled by PDCCH of the SCell. Considering DSS in NR, resources for a PDCCH of a PCell/SCell may be restricted. For offloading the PCell/SCell PDCCH, NR PDCCH enhancements for cross-carrier scheduling including PDCCH of SCell scheduling PDSCH or PUSCH on P(S) Cell may be introduced. Particularly, a total PDCCH blind decoding budget may be unchanged.

System Overview

In the case that a P(S)Cell is a scheduled cell (or a scheduling cell) a total PDCCH blind decoding budget may be unchanged. The total PDCCH blind decoding budget may include a minimum of two parameters, which is discussed in greater detail below.

In the case that the P(S)Cell is scheduled by a SCell, a candidate for monitoring to avoid an increase in the PDCCH blind decoding budget/complexity may be determined based on any of the methods described below.

A first method can include, in the case that search space sharing for DL(UL) is supported by a UE, at least one scheduled SCell with same size of DCI format 0_1/1_1 as that of DCI format 0_1/1_1 on PCell can be configured. For PDCCH blind decoding for the scheduled PCell and the scheduled SCell on the scheduling cell, only blind decoding in the USS for the scheduled SCell is performed.

A second method can include configuring M1 candidates for self-scheduling and M2 candidates for cross-carrier scheduling for a same cell. This can include the candidates being configured in a search space that are used for self-scheduling and also used for cross-carrier scheduling. This also can include the candidates being configured in a search space are used for cross-carrier scheduling in addition to the candidates configured for self-scheduling. This also can include the candidates being configured in a search space are only used for cross-carrier scheduling or for self-scheduling. In addition, the total candidates for a USS can include the candidates of nrofCandidates (if any) and nrofandidates-r17 (if any).

A third method can include configuring (or predefining) an order of blind decoding for a cell. An order of the blind decoding can include first performing self-scheduling blind decoding then performing cross-carrier scheduling blind decoding. The order can also include first performing cross-carrier scheduling blind decoding and then performing self-scheduling blind decoding. Self-scheduling and cross-carrier scheduling can both be supported for the cell.

A fourth method can include the candidates for monitoring being used for cross-carrier scheduling for P(S)Cell that are counted in the candidates for monitoring used for self-scheduling for SCell.

In the case that a P(S)Cell can be scheduled by SCell, to maintain the cell number of P(S)Cell as 1 for both self-scheduling and cross-carrier scheduling includes one of the following methods. A first method can include the PCell only being counted into one cell as the scheduling cell for PCell or scheduled cell for its scheduling cell. A second method can include the PCell being counted as a P1 cell as the scheduling cell for PCell and a P2 cell as scheduled cell for its scheduling cell. In such an instance, P1 and P2 can equal 1. P1 and P2 can be determined by one of following schemes. A first scheme can include P1/P2=M1/M2, wherein M1 is the candidate for self-scheduling and M2 is the candidate for cross-carrier scheduling for a same cell. A second scheme can include configuring P1 and/or P2.

There may be two PDCCH blind decoding parameters, one may include $M_{PDCCH}^{max,slot,\mu}$ or $C_{PDCCH}^{max,slot,\mu}$, while the other can include $M_{PDCCH}^{total,slot,\mu}$ or $C_{PDCCH}^{total,slot,\mu}$. For each scheduled cell, the UE may not be required to monitor on the active DL bandwidth part (BWP) with a SCS configuration μ of the scheduling cell more than $\min(M_{PDCCH}^{max,slot,\mu}, M_{PDCCH}^{total,slot,\mu})$ PDCCH candidates or more than $(C_{PDCCH}^{max,slot,\mu}, C_{PDCCH}^{total,slot,\mu})$ non-overlapped CCEs per slot. The budget can be a minimum of two parameters.

Table 1 as provided below provides a maximum number of monitored PDCCH candidates, $M_{PDCCH}^{max,slot,\mu}$, per slot for a UE in a DL BWP with SCS configuration μ for operation with a single serving cell.

TABLE 1

Maximum number $M_{PDCCH}^{max, slot, \mu}$ of monitored PDCCH candidates per slot for a DL BWP with SCS configuration μ ∈ {0, 1, 2, 3} for a single serving cell

| μ | Maximum number of monitored PDCCH candidates per slot and per serving cell $M_{PDCCH}^{max, slot, \mu}$ |
|---|---|
| 0 | 44 |
| 1 | 36 |
| 2 | 22 |
| 3 | 20 |

Table 2 can provide the maximum number of non-overlapped CCEs, $C_{PDCCH}^{max,slot,\mu}$, for a DL BWP with SCS configuration μ that a UE is expected to monitor corresponding PDCCH candidates per slot for operation with a single serving cell.

CCEs for PDCCH candidates can be non-overlapped if they correspond to different CORESET indexes, or different first symbols for the reception of the respective PDCCH candidates.

TABLE 2

Maximum number $C_{PDCCH}^{max, slot, \mu}$ of non-overlapped CCEs per slot for a DL BWP with SCS configuration μ ∈ {0, 1, 2, 3} for a single serving cell.

| μ | Maximum number of non-overlapped CCEs per slot and per serving cell $C_{PDCCH}^{max, slot, \mu}$ |
|---|---|
| 0 | 56 |
| 1 | 56 |
| 2 | 48 |
| 3 | 32 |

If a UE is configured with $N_{cells}^{DL,\mu}$ downlink cells with DL BWPs having SCS configuration μ where $$\sum_{\mu=0}^{3} N_{cells}^{DL,\mu} \leq N_{cells}^{cap},$$

the UE may not be required to monitor, on the active DL BWP of the scheduling cell, more than $M_{PDCCH}^{total,slot,\mu}=M_{PDCCH}^{max,slot,\mu}$ PDCCH candidates or more than $C_{PDCCH}^{total,slot,\mu}=C_{PDCCH}^{max,slot,\mu}$ non-overlapped CCEs per slot for each scheduled cell.

If a UE is configured with $N_{cells}^{DL,\mu}$ downlink cells with DL BWPs having SCS configuration μ, where $$\sum_{\mu=0}^{3} N_{cells}^{DL,\mu} > N_{cells}^{cap},$$

a DL BWP of an activated cell is the active DL BWP of the activated cell, and a DL BWP of a deactivated cell is the DL BWP with index provided by firstActiveDownlinkBWP-Id for the deactivated cell, the UE may not be required to monitor more than $$M_{PDCCH}^{total, slot, \mu} = \left\lfloor N_{cells}^{cap} \cdot M_{PDCCH}^{max, slot, \mu} \cdot N_{cells}^{DL,\mu} / \sum_{j=0}^{3} N_{cells}^{DL,j} \right\rfloor$$

PDCCH candidates or more than $$C_{PDCCH}^{total, slot, \mu} = \left\lfloor N_{cells}^{cap} \cdot C_{PDCCH}^{max, slot, \mu} \cdot N_{cells}^{DL,\mu} / \sum_{j=0}^{3} N_{cells}^{DL,j} \right\rfloor$$

non-overlapped CCEs per slot on the active DL BWP(s) of scheduling cell(s) from the $N_{cells}^{DL,\mu}$ downlink cells.

For each scheduled cell, the UE may not be required to monitor on the active DL BWP with SCS configuration μ of the scheduling cell more than $\min(M_{PDCCH}^{max,slot,\mu}, M_{PDCCH}^{total,slot,\mu})$ PDCCH candidates or more than $\min(C_{PDCCH}^{max,slot,\mu}, C_{PDCCH}^{total,slot,\mu})$ non-overlapped CCEs per slot.

For all search space sets within a slot n, denote by $s_{css}$ a set of CSS sets with cardinality of $I_{css}$ and by $S_{css}$ a set of USS sets with cardinality of $J_{css}$. The location of USS sets $s_j$, $0 \leq j < J_{css}$, in $s_{css}$ can be according to an ascending order of the search space set index.

Denoted by $M_{S_{on}}^{(L)}$, $0 \leq i < I_{css}$, the number of counted PDCCH candidates for monitoring for CSS set $s_{css}(i)$ and by $M_{S_{on}(j)}^{(L)}$, $0 \leq j < J_{css}$, the number of counted PDCCH candidates for monitoring for USS set $s_{uss}(j)$.

For the CSS sets, a UE can $$M_{PDCCH}^{CSS} = \sum_{i=0}^{I_{CSS}-1} \sum_{L} M_{S_{CSS}(i)}^{(L)}$$

PDCCH candidates requiring a total of $C_{PDCCH}^{CSS}$ non-overlapping CCEs in a slot.

The UE can allocate PDCCH candidates for monitoring to USS sets for the primary cell having an active DL BWP with SCS configuration μ in slot n according to the following pseudocode. A UE may not expect to monitor PDCCH in a USS set without allocated PDCCH candidates for monitoring. That may indicate the configured candidates in that USS are all dropped.

Denoted by $V_{CCE}(S_{uss}(j))$ the set of non-overlapping CCEs for search space set $S_{uss}(j)$ and by $\ell$ ($V_{CEE}(S_{uss}(j))$) the cardinality of $V_{CEE}(S_{uss}(j))$ where the non-overlapping CCEs for search space set $s_{uss}(j)$ may be determined considering the allocated PDCCH candidates for monitoring for the CSS sets and the allocated PDCCH candidates for monitoring for all search space sets $S_{uss}(k)$, $0 \leq k \leq j$.

Set $M_{PDCCH}^{uss} = \min\left(M_{PDCCH}^{max,slot,\mu}, M_{PDCCH}^{total,slot,\mu}\right) - M_{PDCCH}^{css}$ Set $C_{PDCCH}^{uss} = \min\left(C_{PDCCH}^{max,slot,\mu}, C_{PDCCH}^{total,slot,\mu}\right) - C_{PDCCH}^{css}$ Set $j = 0$ while $\sum_{L} M_{S_{uss}(j)}^{(L)} \leq M_{PDCCH}^{uss}$ AND $C(V_{CCE}(S_{uss}(j))) \leq C_{PDCCH}^{uss}$ allocate $$\sum_{L} M_{S_{uss}(j)}^{(L)}$$

PDCCH candidates for monitoring to USS set $S_{uss}(j)$ $M_{PDCCH}^{uss} = M_{PDCCH}^{uss} - \sum_{L} M_{S_{uss}(j)}^{(L)}$;

$C_{PDCCH}^{uss} = C_{PDCCH}^{uss} - C(V_{CCE}(S_{uss}(j)))$;

$j = j + 1$;

end while

In case P(S)Cell can be a scheduled cell, which also can be a scheduling cell, the total PDCCH blind decoding budget may be larger than $\min(M_{PDCCH}^{max,slot,\mu}, M_{PDCCH}^{total,slot,\mu})$ PDCCH candidates or more than $\min(C_{PDCCH}^{max,slot,\mu}, C_{PDCCH}^{total,slot,\mu})$ non-overlapped CCEs per slot. This may be because, for cross-carrier scheduling, the number of PDCCH candidates for monitoring and the number of non-overlapped CCEs per slot may be separately counted for each scheduled cell.

While the candidates are used as an example to represent PDCCH blind decoding budget in the following embodiments, similar non-overlapped CCEs and can be also applied as described herein.

The present embodiments as described below may illustrate embodiment to prevent increasing the PDCCH blind decoding budget in the case P(S)Cell is a scheduled cell.

Embodiment 1

In the case that search space sharing for DL(UL) is supported by a UE, at least one scheduled SCell with same size of DCI format 0_1/1_1 as that of DCI format 0_1/1_1 can be configured on PCell. For PDCCH blind decoding for the scheduled PCell and the scheduled SCell on the scheduling cell, blind decoding in the USS for the scheduled SCell may be performed.

In a Carrier Aggregation scenario, configuring the P(S) Cell (named cell A) can be scheduled by SCell (named cell B). For cell B, configuring cell B can be a scheduling cell, and support scheduling Cell A. Cell A may be scheduled by CIF=X on the scheduling cell B, wherein X can be one value of set [1, . . . , 7] or [0, . . . , 7].

For PDCCH blind decoding for P(S)Cell, this can include the blind decoding (BD) for scheduling P(S)Cell itself in case the P(S)Cell is scheduling cell, and the BD for scheduling P(S)Cell in case the scheduling cell is cell B. In order to not increase the PDCCH blind decoding budget, the scheme as described below can be utilized.

Cell A and other N serving cells that are scheduled by cell B can be configured, wherein N can include an integer that is larger than 0. FIG. 1 is a block diagram 100 illustrating a first exemplary CA scheduling procedure. For at least one of N cells (N=2 in FIG. 1), named cell C, configuring CIF=Y for cell C and the size of DCI format 0_1/1_1 for scheduling cell C may be the same as the size of DCI format 0_1/1_1 for scheduling cell A. Meanwhile, a UE can support a search space sharing by indicating through searchSpaceSharingCA-UL or through searchSpaceSharingCA-DL. For PDCCH blind decoding for the scheduled PCell and the scheduled SCell on the scheduling cell, blind decoding may only be performed in the USS for the scheduled SCell. The DCI format can be DCI format 0_1 or 1_1, or DCI format 0_2 or 1_2.

In some embodiments, a UE can support an uplink search space sharing by indicating through searchSpaceSharingCA-UL.

For scheduling cell B, cell A with CIF=1 and cell C with CIF=2 can be scheduled by cell B. A size of DCI format 0_1 for scheduling cell A can be the same as size of DCI format 0_1 for scheduling cell C. Then, for PDCCH blind decoding for the cell A and the cell C on the scheduling cell, blind decoding may only be performed in the USS determined by CIF=2 for the cell C. In this way, DCI with CIF=1 can be also detected in the USS determined by CIF=2 using search space sharing. For cell A, PDCCH blind decoding can also be performed in case cell A is a scheduling cell. The total PDCCH blind decoding budget may not increase.

In some embodiments, only performing blind decoding in the USS for the scheduled SCell in case DCI size may be the same for scheduling the SCell and for scheduling the P(S) Cell by search space sharing. To achieve blind decoding for P(S)Cell may only include the blind decoding for the P(S)Cell in case the P(S)Cell is the scheduling cell, and not include the blind decoding for the P(S)Cell in case the P(S)Cell is the scheduled cell. Then, the total PDCCH blind decoding budget may not be increased in the case P(S)Cell is supported to be scheduled by SCell. The complexity of blind decoding of UE may not be increased.

Embodiment 2

A second embodiment may relate to configuring M1 candidates for self-scheduling and M2 candidates for cross-carrier scheduling for a same cell. Such configuration can include at least one of the following: the candidates are configured in a search space are used for self-scheduling and also used for cross-carrier scheduling; the candidates are configured in a search space are used for cross-carrier scheduling in addition to the candidates configured for self-scheduling; the candidates are configured in a search space are only used for cross-carrier scheduling or for self-scheduling. In addition, the total candidates for a USS can include the candidates of nrofandidates(if any) and nrofCandidates-r17(if any))

In a Carrier Aggregation scenario, configuring the P(S) Cell (named cell A) can be scheduled by SCell(named cell B). For cell B, configuring cell B can be a scheduling cell, and can support scheduling Cell A. Cell A can be scheduled by CIF=X on the scheduling cell B, wherein X can include one value of set [1, . . . , 7] or [0, . . . , 7].

For PDCCH blind decoding for P(S)Cell, including the BD for scheduling P(S)Cell itself in a case that the P(S)Cell is scheduling cell, and the BD for scheduling P(S)Cell in case the scheduling cell can be cell B. In order to not increase the PDCCH blind decoding budget, the scheme described below can be utilized.

For P(S)Cell, M1 candidates for self-scheduling and M2 candidates for cross-carrier scheduling for a same cell can be configured. The method of configuration can include at least one of: the candidates are configured in a search space are used for self-scheduling and also used for cross-carrier scheduling (e.g., USS), only nrofCandidates can be configured for both self-scheduling and cross-carrier scheduling for the P(S)Cell; the candidates are configured in a search space are used for cross-carrier scheduling in addition to the candidates configured for self-scheduling (e.g., USS), nrofandidates can be configured for self-scheduling and nrofCandidates-r17 is configured for cross-carrier scheduling for the P(S)Cell; the candidates are configured in a search space are only used for cross-carrier scheduling (e.g., USS), nrofCandidates can be configured for self-scheduling, or nrofCandidates-r17 can configured for cross-carrier scheduling for the P(S)Cell. In addition, when M1+M2=M, candidates do not need to be dropped when M≤min $(M_{PDCCH}^{max,slot,\mu}, M_{PDCCH}^{total,slot,\mu})$, otherwise candidates dropping can be expected. This can indicate that the total candidates for a USS can include the candidates of nrofCandidates(if any) and nrofCandidates-r17(if any). After candidates dropping, the total PDCCH blind decoding budget may not be increased.

Wherein, nrofCandidates is configured by the following signaling structure, and similar with nrofCandidates-r17.

| | |
|---|---|
| nrofCandidates | SEQUENCE { |
|   aggregationLevel1 | ENUMERATED {n0, n1, n2, n3, n4, n5, n6, n8}, |
|   aggregationLevel2 | ENUMERATED {n0, n1, n2, n3, n4, n5, n6, n8}, |
|   aggregationLevel4 | ENUMERATED {n0, n1, n2, n3, n4, n5, n6, n8}, |
|   aggregationLevel8 | ENUMERATED {n0, n1, n2, n3, n4, n5, n6, n8}, |
|   aggregationLevel16 | ENUMERATED {n0, n1, n2, n3, n4, n5, n6, n8] |
| } Setup | OPTIONAL, -- Cond |

In one embodiment, in case P(S)Cell scheduled by SCell is not supported, a Common search space (CSS) #0 with 6 candidates (6BDs) can be configured, CSS #1 with 6 candidates (6BDs), USS (UE specific search space) #2 with 16 candidates (32BDs), the total is 44BDs, with subcarrier spacing (SCS) including 15 khz for P(S)Cell, that is p=0. The candidates of nrofCandidates configured in search space can be the resource of candidates, after multiplying the number of different size of DCI formats can be carried by the candidates, obtain the number of BDs, also named candidates for monitoring. For example, there may only be one size of DCI formats in the CSS, then the number of BDs can be equal to the number of candidates. For example, there are two size of DCI formats in the USS, then the number of BDs can be two times of the number of candidates.

In case P(S)Cell scheduled by SCell is supported, CSS #0 with 6 candidates (6BDs) can be configured, CSS #1 with 6 candidates (6BDs), USS #2 with 16 candidates (32BDs), then BDs for USS #2 used for self-scheduling can include 32 and BDs for USS #2 used for cross-carrier scheduling is 32, the total is 76BDs, which can be larger than the PDCCH blind decoding budget. In order to avoid larger than the budget, one of the following methods can be used.

A first method can include, for USS #2, only nrofCandidates may be configured for both self-scheduling and cross-carrier scheduling for the P(S)Cell. If the total candidates of nrofCandidates is 8 (that is 16BDs), there may be 16BDs for cross-carrier scheduling and 6+6+16=28BDs for self-scheduling. The total BDs for the P(S)Cell can be 44BDs. For candidates dropping in a slot with all above search spaces, the candidates for monitoring of USS #2 can be 16+16=32 and may not be dropped with assuming µ=0 and $M_{PDCCH}^{total,slot,\mu}=M_{PDCCH}^{max,slot,\mu}$. If the total candidates of nrofCandidates is 10 (that is 20BDs), there may be 20BDs for cross-carrier scheduling and 6+6+20=32BDs for self-scheduling. The total BDs for the P(S)Cell may be 52BDs. For candidates dropping in a slot with all above search spaces, the candidates for monitoring of USS #2 may be 20+20=40 and can be dropped with assuming µ=0 and $M_{PDCCH}^{total,slot,\mu}=M_{PDCCH}^{max,slot,\mu}$.

In a second method, for USS #2, the candidates configured in a search space can be used for cross-carrier scheduling in addition to the candidates configured for self-scheduling. If the total candidates of nrofCandidates is 6 (that is 12BDs) and the total candidates of nrofCandidates-r17 is 10 (that is 20BDs), there may be 20BDs for cross-carrier scheduling and 6+6+12=24BDs for self-scheduling. The total BDs for the P(S)Cell can be 44BDs. For candidates dropping in a slot with all above search spaces, the candidates for monitoring of USS #2 can be 12+20=32 and may not be dropped with assuming µ=0 and $M_{PDCCH}^{total,slot,\mu}=M_{PDCCH}^{max,slot,\mu}$. If the total candidates of nrofCandidates is 8 (that is 16BDs) and the total candidates of nrofCandidates-r17 is 10 (that is 20BDs), there may be 20BDs for cross-carrier scheduling and 6+6+16=28BDs for self-scheduling. The total BDs for the P(S)Cell may be 48BDs. For candidates dropping in a slot with all above search spaces, the candidates for monitoring of USS #2 may be 16+20=36 and may not be dropped with assuming µ=0 and $M_{PDCCH}^{total,slot,\mu}=M_{PDCCH}^{max,slot,\mu}$.

In a third method, for a USS, the candidates configured in a search space may be used for self-scheduling or for cross-carrier scheduling. If the total candidates of nrofCandidates is 6 (that is 12BDs) of USS #2 configuration for self-scheduling, and the total candidates of nrofCandidates-r17 is 10 (that is 20BDs) of USS #3 configuration for cross-carrier scheduling, there may be 20BDs for cross-carrier scheduling and 6+6+12=24BDs for self-scheduling. The total BDs for the P(S)Cell may be 44BDs. For candidates dropping in a slot with all above search spaces, the candidates for monitoring of USS #2 may be 12 and USS #3 may be 20, both USS #2 and USS #3 may not be dropped with assuming µ=0 and $M_{PDCCH}^{total,slot,\mu}=M_{PDCCH}^{max,slot,\mu}$. If the total candidates of nrofCandidates is 8 (that is 16BDs) of USS #2 configuration for self-scheduling, and the total candidates of nrofCandidates-r17 is 10 (that is 20BDs) of USS #3 configuration for cross-carrier scheduling, there may be 20BDs for cross-carrier scheduling and 6+6+ 16=28BDs for self-scheduling. The total BDs for the P(S) Cell may be 48BDs. For candidates dropping in a slot with all above search spaces, the candidates for monitoring of USS #2 may be 16 and USS #3 may be 20, then USS #2 may not be dropped but USS #3 will be dropped with assuming µ=0 and $M_{PDCCH}^{total,slot,\mu}=M_{PDCCH}^{max,slot,\mu}$. As a result, USS #3 may not be used for cross-carrier scheduling of P(S)Cell, which can indicate that P(S)Cell is scheduled by SCell through USS #3 may not be supported. If the total candidates of nrofCandidates-r17 is 8 (that is 16BDs) of USS #2 configuration for cross-carrier scheduling, and the total candidates of nrofCandidates is 10 (that is 20BDs) of USS #3 configuration for self-scheduling, there may be 16BDs for cross-carrier scheduling and 6+6+20=32BDs for self-scheduling. The total BDs for the P(S)Cell may be 48BDs. For candidates dropping in a slot with all above search spaces, the candidates for monitoring of USS #2 may be 16 and USS #3 may be 20, then USS #2 may not be dropped but USS #3 will be dropped with assuming µ=0 and $M_{PDCCH}^{total,slot,\mu}=M_{PDCCH}^{max,slot,\mu}$. As a result, USS #2 can be used for cross-carrier scheduling of P(S)Cell, that means P(S)Cell is scheduled by SCell through USS #2 can be supported.

In one embodiment, the candidates configured in a search space can be used for cross-carrier scheduling can only be configured on P(S)Cell. In another embodiment, P(S)Cell can be scheduled by SCell, in case there is at least a USS which the candidates configured in the USS used for cross-carrier scheduling are valid candidates for monitoring.

In one embodiment, through including the valid USS used for cross-carrier scheduling of P(S)Cell after candidates dropping of all the configured search spaces, to achieve that self-scheduling and cross-carrier scheduling are both supported for the P(S)Cell. Then, the total PDCCH blind decoding budget may not be increased in case P(S)Cell is supported to be scheduled by SCell. The complexity of blind decoding of UE may not increase.

Embodiment 3

A third embodiment may include predefining/configuring the order of blind decoding for a cell. The order of blind decoding can include first performing self-scheduling blind decoding then performing cross-carrier scheduling blind decoding; or first performing cross-carrier scheduling blind decoding then performing self-scheduling blind decoding. Self-scheduling and cross-carrier scheduling can both be supported for the cell.

In a Carrier Aggregation scenario, configuring the P(S) Cell (named cell A) can be scheduled by SCell (named cell B). For cell B, configuring cell B can be a scheduling cell, and support scheduling Cell A. Cell A may be scheduled by CIF=X on the scheduling cell B, wherein X may be one value of set [1, . . . , 7] or [0, . . . , 7].

For PDCCH blind decoding for P(S)Cell, including the BD for scheduling P(S)Cell itself in case the P(S)Cell is scheduling cell, and the BD for scheduling P(S)Cell in case the scheduling cell is cell B. In order to not increase the PDCCH blind decoding budget, the scheme listed below can be utilized.

In one embodiment, for P(S)Cell, if predefine/configure the order of blind decoding includes first performing self-scheduling blind decoding then performing cross-carrier scheduling blind decoding, candidates dropping may be first performed for the USS configured with the candidates for self-scheduling. After that, the rest of blind decoding budget may be used for candidates dropping for the USS configured with the candidates for cross-carrier scheduling. P(S)Cell can be scheduled by SCell, in case there is at least a USS which the candidates configured in the USS used for cross-carrier scheduling are valid candidates for monitoring.

In one embodiment, for P(S)Cell, if predefine/configure the order of blind decoding includes first performing cross-carrier scheduling blind decoding then performing self-scheduling blind decoding, candidates dropping may first be performed for the USS configured with the candidates for cross-carrier scheduling. After that, the rest of blind decoding budget can be used for candidates dropping for the USS configured with the candidates for self-scheduling. P(S)Cell can be scheduled by SCell, in case there is at least a USS which the candidates configured in the USS used for cross-carrier scheduling are valid candidates for monitoring. A USS which the candidates configured for self-scheduling can include valid candidates for monitoring can be used for self-scheduling blind decoding for the P(S)Cell.

The method of configuration of candidates for cross-carrier scheduling can include any of the following: the candidates configured in a search space can be used for self-scheduling and also can be used for cross-carrier scheduling; the candidates can be configured in a search space are can be used for cross-carrier scheduling in addition to the candidates configured for self-scheduling; the candidates can be configured in a search space are only used for cross-carrier scheduling or for self-scheduling. The PDCCH blind decoding complexity may not be increased after candidate dropping by the order of blind decoding for a cell.

In one embodiment, in case P(S)Cell scheduled by SCell is not supported, configure CSS #0 with 6 candidates (6BDs), CSS #1 with 6 candidates (6BDs), USS #2 with 16 candidates (32BDs), the total is 44BDs, with assuming subcarrier spacing (SCS) can be 15 khz for P(S)Cell, that is µ=0. The candidates of nrofCandidates can be configured in search space is the resource of candidates, after multiplying the number of different size of DCI formats can be carried by the candidates, obtain the number of BDs, also named candidates for monitoring. For example, there are only one size of DCI formats in the CSS, then the number of BDs is equal to the number of candidates. As another example, there are two size of DCI formats in the USS, then the number of BDs is two times of the number of candidates.

In case P(S)Cell scheduled by SCell is supported, configure CSS #0 with 6 candidates (6BDs), CSS #1 with 6 candidates (6BDs), USS #2 with 6 candidates (12BDs), USS #4 with 6 candidates (12BDs) for self-scheduling, configure USS #3 with 4 candidates (8BDs), USS #4 with 4 candidates (8BDs) for cross-carrier scheduling (that means scheduled by SCell). Then the total is 52BDs which is larger than the PDCCH blind decoding budget. In order to avoid larger than the budget, one of the following methods can be used.

In a first method, if predefine/configure the order of blind decoding includes first performing self-scheduling blind decoding then performing cross-carrier scheduling blind decoding, candidates dropping may first be performed for the USS configured with the candidates for self-scheduling. For candidates dropping in a slot with all above search spaces, the rest of blind decoding budget is 44−(6+6+12+12)=8 (assume μ=0 and $M_{PDCCH}^{total,slot,\mu}=M_{PDCCH}^{max,slot,\mu}$). There may be no overbooking. The rest of blind decoding budget may be used for candidates dropping for the USS configured with the candidates for cross-carrier scheduling. P(S)Cell can be scheduled by SCell, in case there is at least a USS which the candidates configured in the USS used for cross-carrier scheduling are valid candidates for monitoring. After candidates dropping, USS #3 can be valid and USS #5 is dropped. As a result, USS #3 can be used for cross-carrier scheduling of P(S)Cell, which means P(S)Cell can be scheduled by SCell through USS #3 can be supported.

In a second method, if predefine/configure the order of blind decoding includes first performing cross-carrier scheduling blind decoding then performing self-scheduling blind decoding, candidates dropping may first be performed for the USS configured with the candidates for cross-carrier scheduling. For candidates dropping in a slot with all above search spaces, the rest of blind decoding budget may be 44−(8+8)=28 (assuming μ=0 and $M_{PDCCH}^{total,slot,\mu}=M_{PDCCH}^{max,slot,\mu}$). There may be no overbooking. P(S)Cell can be scheduled by SCell. The rest of blind decoding budget can be used for candidates dropping for the USS configured with the candidates for self-scheduling. After candidates dropping, USS #2 can be valid and USS #4 may be dropped. As a result, USS #3 and USS #5 can be used for cross-carrier scheduling of P(S)Cell, which means P(S)Cell can be scheduled by SCell through USS #3 can be supported. CSS #0, CSS #1 and USS #2 can be used for self-scheduling of P(S)Cell, which means that USS #4 can be dropped and may not be used for self-scheduling of P(S)Cell.

In one embodiment, if predefine/configure the order of blind decoding includes first performing cross-carrier scheduling blind decoding then performing self-scheduling blind decoding, to guarantee that CSS is always valid, the additional configuration can include one of the following. In case the candidates configured in a search space are used for self-scheduling and also used for cross-carrier scheduling, the total candidates for all search spaces may not be expected to be larger than the PDCCH blind decoding budget. In case the candidates configured in a search space are used for cross-carrier scheduling in addition to the candidates configured for self-scheduling, the total candidates for all CSS and all search spaces with candidates used for cross-carrier scheduling may not be expected to be larger than the PDCCH blind decoding budget. In case the candidates configured in a search space are only used for cross-carrier scheduling or for self-scheduling, the total candidates for all CSS and all search spaces with candidates used for cross-carrier scheduling may not be expected to be larger than the PDCCH blind decoding budget.

In one embodiment, the candidates configured in a search space are used for cross-carrier scheduling can only be configured on P(S)Cell. In one embodiment, P(S)Cell can be scheduled by SCell, in case there is at least a USS which the candidates configured in the USS used for cross-carrier scheduling are valid candidates for monitoring.

In one embodiment, through predefine/configure the order of blind decoding for a cell with restriction of the PDCCH blind decoding budget, to achieve that self-scheduling and cross-carrier scheduling are both supported for the P(S)Cell. Then the total PDCCH blind decoding budget may not be increased in case P(S)Cell is supported to be scheduled by SCell. The complexity of blind decoding of UE may not increase.

Embodiment 4

The candidates for monitoring may be used for cross-carrier scheduling for P(S)Cell is counted in the candidates for monitoring used for self-scheduling for SCell. In a Carrier Aggregation scenario, configuring the P(S)Cell (named cell A) can be scheduled by SCell (named cell B). For cell B, configuring cell B can include a scheduling cell, and support scheduling Cell A. Cell A may be scheduled by CIF=X on the scheduling cell B, wherein X can include one value of set [1, . . . , 7] or [0, . . . , 7].

For PDCCH blind decoding for P(S)Cell, including the BD for scheduling P(S)Cell itself in case the P(S)Cell can include a scheduling cell, and the BD for scheduling P(S)Cell in case the scheduling cell can be cell B. In order to not increase the PDCCH blind decoding budget, the scheme listed below can be used.

For P(S)Cell, blind decoding for P(S)Cell only include the blind decoding for the P(S)Cell in case the P(S)Cell may be the scheduling cell. The blind decoding for the P(S)Cell in case the P(S)Cell may be the scheduled cell is counted the candidates for monitoring (also named blind decoding) used for self-scheduling for SCell. The P(S)Cell may be scheduled by the SCell.

Candidates overbooking/dropping can be only performed on primary cell. All the candidates for monitoring for SCell may not be larger than the PDCCH blind decoding budget. As a result, the candidates for monitoring used for cross-carrier scheduling for P(S)Cell plus the candidates for monitoring used for self-scheduling for SCell may not be expected to be larger than the PDCCH blind decoding budget.

In one embodiment, in case P(S)Cell scheduled by SCell is not supported, CSS #0 with 6 candidates (6BDs) can be configured, CSS #1 with 6 candidates (6BDs), USS #2 with 16 candidates (32BDs), the total is 44BDs, with assume subcarrier spacing (SCS) is 15 khz for P(S)Cell, that is μ=0. The candidates of nrofCandidates can be configured in search space is the resource of candidates, after multiplying the number of different size of DCI formats can be carried by the candidates, obtain the number of BDs, also named candidates for monitoring. For example, there may be only one size of DCI formats in the CSS, then the number of BDs is equal to the number of candidates. For example, there may be two size of DCI formats in the USS, then the number of BDs is two times of the number of candidates.

In case P(S)Cell scheduled by SCell is supported, CSS #0 with 6 candidates (6BDs) can be configured, CSS #1 with 6 candidates (6BDs), USS #2 with 6 candidates (12BDs), USS #4 with 6 candidates (12BDs) for self-scheduling, configure USS #3 with 8 candidates (16BDs) for cross-carrier scheduling (scheduled by SCell). The total can be 52BDs, which can be larger than the PDCCH blind decoding budget. In order to avoid larger than the budget, the following methods can be used.

The candidates for monitoring used for cross-carrier scheduling for P(S)Cell can be counted in the candidates for monitoring used for self-scheduling for SCell. The candidates for monitoring can be used for cross-carrier scheduling for P(S)Cell plus the candidates for monitoring used for self-scheduling for SCell is not expected to be larger than the PDCCH blind decoding budget. For example, the search spaces configured on the SCell are USS #1 with 6 candidates (12BDs), USS #2 with 4 candidates (8BDs) and USS #3 with 4 candidates (8BDs) for self-scheduling, plus the candidates for monitoring used for cross-carrier scheduling for P(S)Cell that is 16, results 28+16=44BDs which is not larger than the PDCCH blind decoding budget(assume µ=0 and $M_{PDCCH}^{total,slot,\mu}=M_{PDCCH}^{max,slot,\mu}$). Blind decoding for P(S)Cell may only include the blind decoding for the P(S)Cell in case the P(S)Cell is the scheduling cell and will also not larger than the PDCCH blind decoding.

In one embodiment, the candidates for monitoring used for cross-carrier scheduling for P(S)Cell can be counted in the candidates for monitoring used for self-scheduling for SCell and guarantee the candidates for monitoring used for cross-carrier scheduling for P(S)Cell plus the candidates for monitoring used for self-scheduling for SCell is not larger than the PDCCH blind decoding budget by gNB configuration, to achieve that self-scheduling and cross-carrier scheduling are both supported for the P(S)Cell. The total PDCCH blind decoding budget may not increase in case P(S)Cell is supported to be scheduled by SCell. The complexity of blind decoding of UE may not increase.

Embodiment 5

In the case P(S)Cell can be scheduled by SCell, the Cell number of P(S)Cell is 1 for both self-scheduling and cross-carrier scheduling. In a Carrier Aggregation (CA) scenario, configuring the P(S)Cell(named cell A) can be scheduled by SCell(named cell B). For cell B, configuring cell B can be a scheduling cell, and supports scheduling Cell A. It can be assumed that cell A is scheduled by CIF=X on the scheduling cell B, wherein X in one value of set [1, . . . , 7] or [0, . . . , 7].

Figure 2:
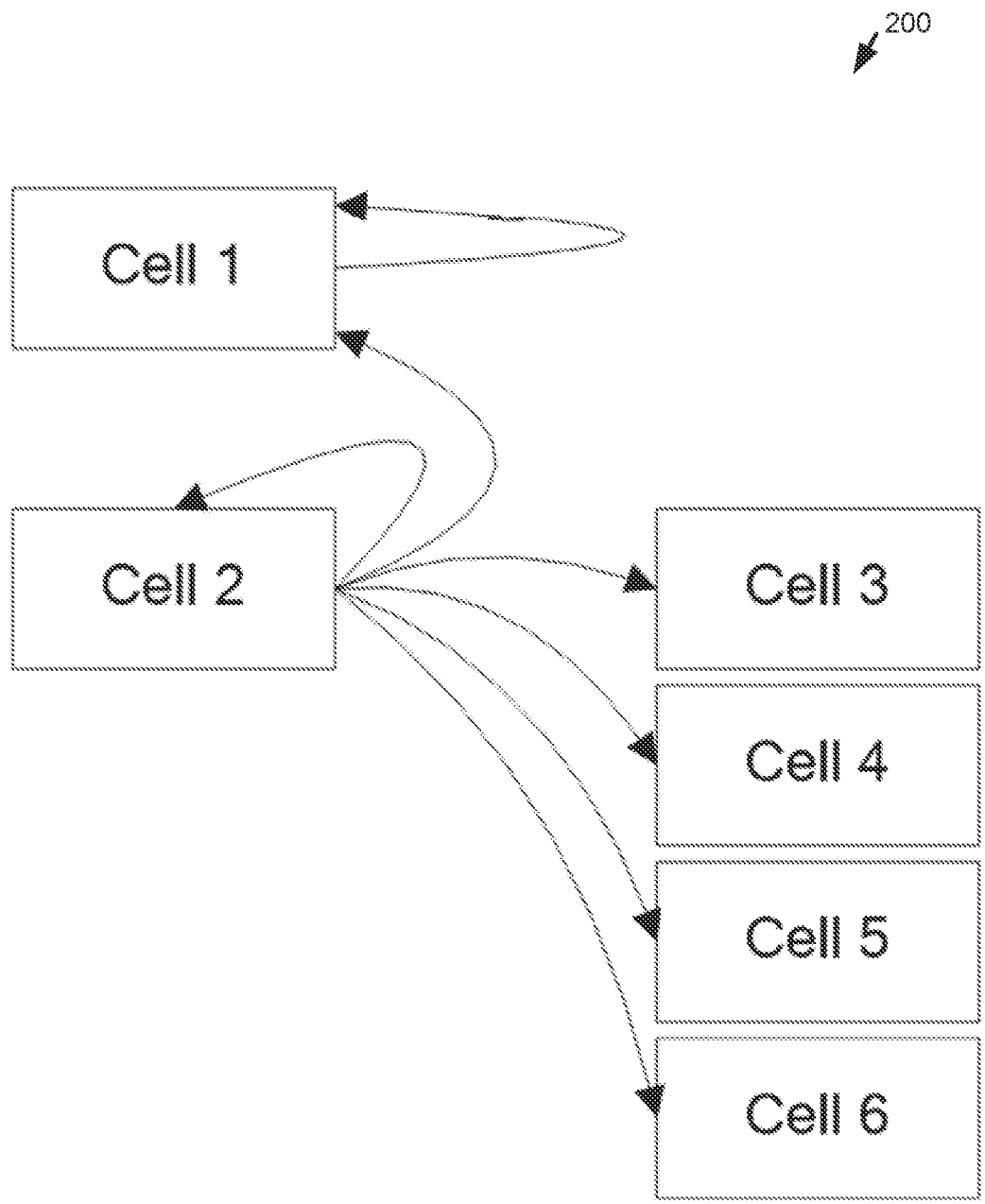
FIG. 2 illustrates a second example of CA scheduling.

FIG. 2 illustrates a block diagram 200 of a second example CA scheduling process. A cell can be configured cell1 to cell6 are scheduled by cell2, wherein cell1 can be a PCell with µ=0 and can be scheduled by cell2 with µ=1. Cell 2 to cell 6 are SCell. The UE can report its carrier aggregation capability is pdcch-BlindDetectionCA=4 cells, that means $N_{cells}^{cap}=4$. Because the 6 configured cells may be larger than $N_{cells}^{cap}$, CA scaling is expected. That can indicate that the UE is not required to monitor more than $$M_{PDCCH}^{total,slot,\mu} = \left\lfloor N_{cells}^{cap} \cdot M_{PDCCH}^{max,slot,\mu} \cdot N_{cells}^{DL,\mu} \bigg/ \sum_{j=0}^{3} N_{cells}^{DL,j} \right\rfloor$$

PDCCH candidates per slot on the active DL BWP(s) of scheduling cell(s) from the $N_{cells}^{DL,\mu}$ downlink cells.

In some instances, M_total_15 khz=floor (4*44*⅙)=29; M_total_30 khz=floor(4*36*6/6)=144. As a result, the blind decoding complexity can be increased because the PCell is counted twice in above calculation. That can mean that the blind decoding budget may also be enlarged compared with the case of PCell not supported to be scheduled. In case the PCell is not supported to be scheduled, M_total_15 khz= floor(4*44*⅙)=29; M_total_30 khz=floor(4*36*⅚)=120.

In one embodiment, in the case P(S)Cell can be scheduled by SCell, to maintain the cell number of P(S)Cell is 1 for both self-scheduling and cross-carrier scheduling can include one of the following methods.

A first method can include the PCell only being counted into one cell as the scheduling cell for PCell or scheduled cell for its scheduling cell. For example, the PCell may only be counted into one cell as the scheduling cell for PCell, then M_total_15 khz=floor(4*44*⅙)=29; M_total_30 khz=floor (4*36*⅚)=120. Blind decoding complexity may not be increased. PDCCH blind decoding budget may not be increased.

In a second method, the PCell may be counted as a P1 cell as the scheduling cell for PCell and P2 cell as scheduled cell for its scheduling cell. In some instances, P1+P2=1. P1 and P2 can be determined by one of following schemes. A first scheme can include P1/P2=M1/M2, wherein M1 is the candidates for self-scheduling and M2 is the candidates for cross-carrier scheduling for a same cell. For example, M1=22, M2=22, then P1=0.5, P2=0.5. Thus, in this example, M_total_15 khz=floor(4*44*0.5/6)=14; M_total_30 khz=floor(4*36*5.5/6)=132. Blind decoding complexity may not be increased. PDCCH blind decoding budget may not be increased. A second scheme can include configuring P1 and/or P2. For example, configuring P1=0.6, P2=0.4. Thus, in this example, M_total_15 khz=floor (4*44*0.6/6)=17; M_total_30 khz=floor(4*36*5.4/6)=129. Blind decoding may not be increased. PDCCH blind decoding budget may not be increased.

In one embodiment, in case P(S)Cell can be scheduled by SCell, the cell number of P(S)Cell can be 1 for both self-scheduling and cross-carrier scheduling. This can allow for the total PDCCH blind decoding budget not to increase in case P(S)Cell is supported to be scheduled by SCell and the number of configured cells is larger than the number of UE reports the carrier aggregation capability. The complexity of blind decoding of UE may not be increased.

Figure 3:
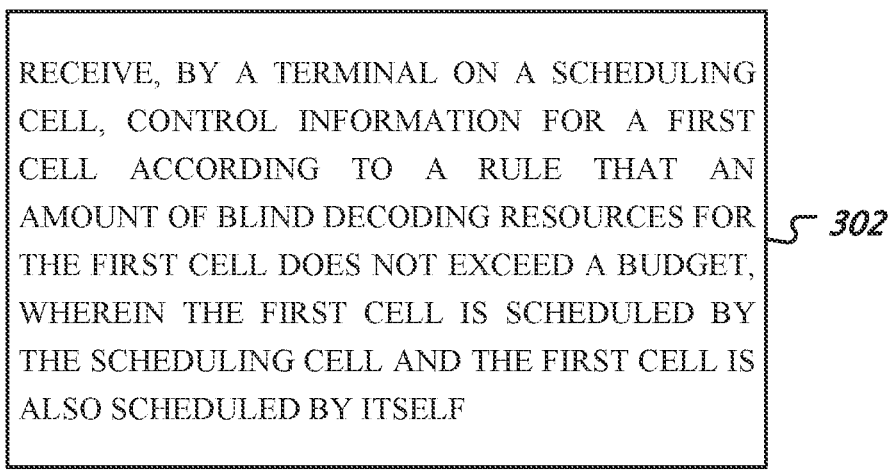
FIG. 3 illustrates an example method for maintaining a PDCCH blind decoding budget in the case that a cell can be scheduled by another cell and by itself.

FIG. 3 illustrates an example method 300 for maintaining a PDCCH blind decoding budget in the case that a cell can be scheduled by another cell and by itself. The method can include receiving, by a terminal on a scheduling cell, control information for a first cell according to a rule that an amount of blind decoding resources for the first cell does not exceed a budget, wherein the first cell is scheduled by the scheduling cell and the first cell is also scheduled by itself (block 302). The first cell can include a candidate cell to be scheduled by the scheduling cell. The rule can specify that PDCCH blind decoding resources remain unchanged.

In some embodiments, the blind decoding resources includes the number of candidates or non-overlapped Control channel elements (CCEs) for physical downlink control channel (PDCCH) blind decoding.

In some embodiments, the first cell comprises one of a primary cell (PCell), a primary secondary cell group cell (PSCell), and a secondary cell (SCell).

In some embodiments, the rule further includes that a second cell different than the first cell includes a size of a downlink control information (DCI) format that is the same as a size of the DCI format of a first cell, wherein a terminal reports capability to support search space sharing for downlink and/or uplink.

In some embodiments, the method includes performing a blind decoding procedure on the scheduling cell for the first cell that only includes a search space of the second cell.

In some embodiments, the rule further includes: configuring a number of candidates for self-scheduling and a number of candidates for cross-carrier scheduling for the first cell.

In some embodiments, the number of candidates in a search space are configured for both self-scheduling and for cross-carrier scheduling.

In some embodiments, the number of candidates in a search space are separately configured for self-scheduling and for cross-carrier scheduling.

In some embodiments, the number of candidates in a search space are configured for self-scheduling or cross-carrier scheduling.

In some embodiments, a number of counted physical downlink control channel (PDCCH) candidates for monitoring for the search space comprises the candidates for self-scheduling combined with the candidates for cross-carrier scheduling.

In some embodiments, the rule further includes: determining an order for performing blind decoding for the first cell, wherein the order is either predefined or configured through high layer signaling.

In some embodiments, the order comprises performance of a self-scheduling blind decoding procedure followed by performance of a cross-carrier scheduling blind decoding procedure.

In some embodiments, before performance of the cross-carrier scheduling blind decoding procedure, the order comprises counting the number of candidates for monitoring using a remaining portion of a budget.

In some embodiments, the order comprises performance of a cross-carrier scheduling blind decoding procedure followed by performance of a self-scheduling blind decoding procedure.

In some embodiments, before performance of the self-scheduling blind decoding procedure, the order comprises counting the number of candidates for monitoring using a remaining portion of a budget.

In some embodiments, the rule further includes: counting candidates for monitoring used for the first cell for cross-carrier scheduling in the number of candidates for monitoring used for the scheduling cell.

In some embodiments, a combined number of candidates for monitoring used for the first cell for cross-carrier scheduling with the number of candidates for monitoring used for the scheduling cell is not larger than the budget.

In some embodiments, the method includes maintaining a cell number for the first cell as 1 cell for both self-scheduling and/or cross-carrier scheduling or counted as 2 cells for self-scheduling and cross-carrier scheduling, wherein the cell number is predefined or configured by high layer signaling.

In some embodiments, the cell number for the first cell is counted as 1 cell as the scheduling cell for the first cell or a scheduled cell for the scheduling cell.

In some embodiments, the cell number for the first cell being counted as 1 cell comprises: counting the first cell as P1 cell as scheduling cell for the first cell and counting a P2 cell as a scheduled cell for the scheduling cell, wherein the cell number of the P1 and the cell number of the P2 combine to equal 1.

In some embodiments, the P1 and P2 are configured by high layer signaling or implicitly derived by the number of candidates for self-scheduling and the number of candidates for cross-carrier scheduling for the first cell.

Example Wireless System

Figure 4:
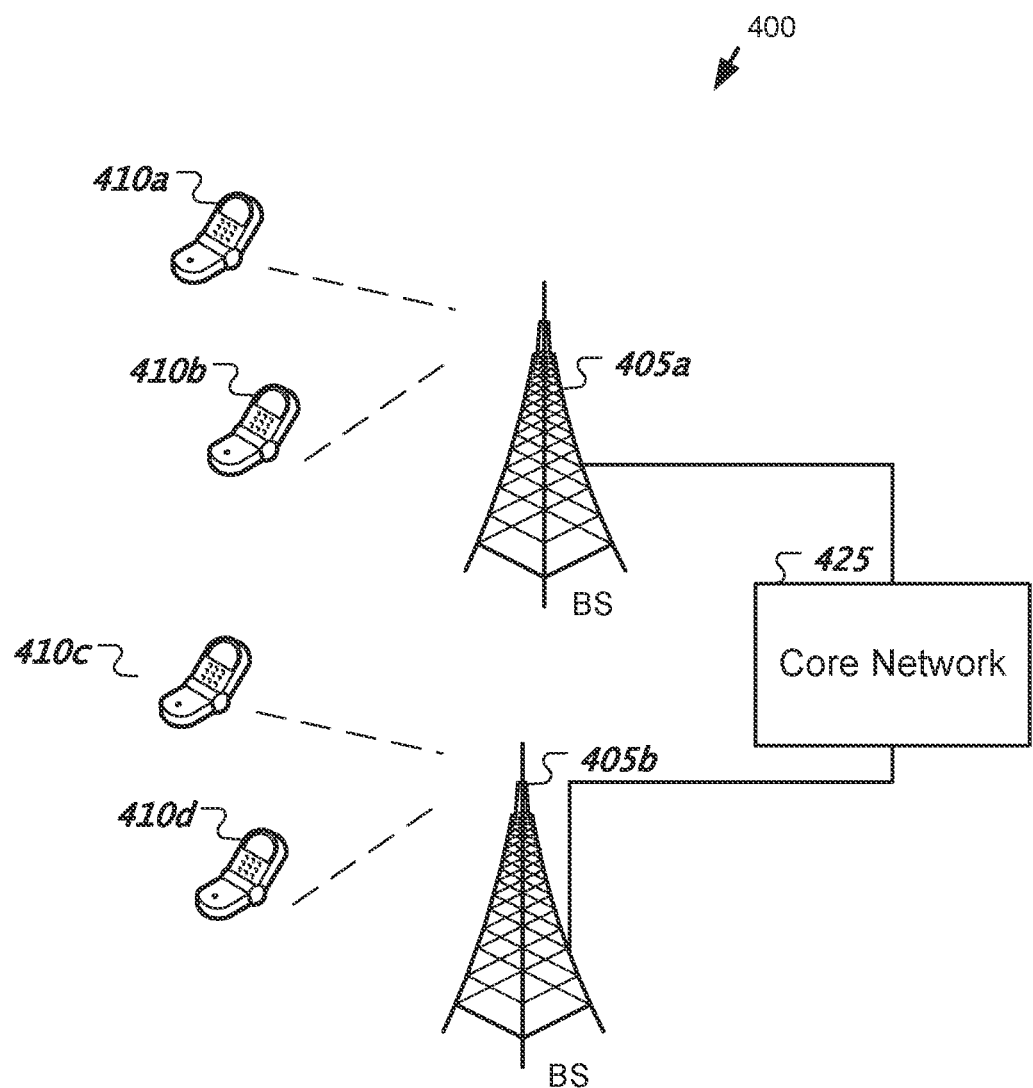
FIG. 4 shows an example of a wireless communication system where techniques in accordance with one or more embodiments of the present technology can be applied.

FIG. 4 shows an example of a wireless communication system where techniques in accordance with one or more embodiments of the present technology can be applied. A wireless communication system 400 can include one or more base stations (BSs) 405a, 405b, one or more wireless devices 410a, 410b, 410c, 410d, and a core network 425. A base station 405a, 405b can provide wireless service to wireless devices 410a, 410b, 410c and 410d in one or more wireless sectors. In some implementations, a base station 405a, 405b includes directional antennas to produce two or more directional beams to provide wireless coverage in different sectors. The base station may implement functionalities of a scheduling cell or a candidate cell, as described in the present document.

The core network 425 can communicate with one or more base stations 405a, 405b. The core network 425 provides connectivity with other wireless communication systems and wired communication systems. The core network may include one or more service subscription databases to store information related to the subscribed wireless devices 410a, 410b, 410c, and 410d. A first base station 405a can provide wireless service based on a first radio access technology, whereas a second base station 405b can provide wireless service based on a second radio access technology. The base stations 405a and 405b may be co-located or may be separately installed in the field according to the deployment scenario. The wireless devices 410a, 410b, 410c, and 410d can support multiple different radio access technologies.

In some implementations, a wireless communication system can include multiple networks using different wireless technologies. A dual-mode or multi-mode wireless device includes two or more wireless technologies that could be used to connect to different wireless networks.

Figure 5:
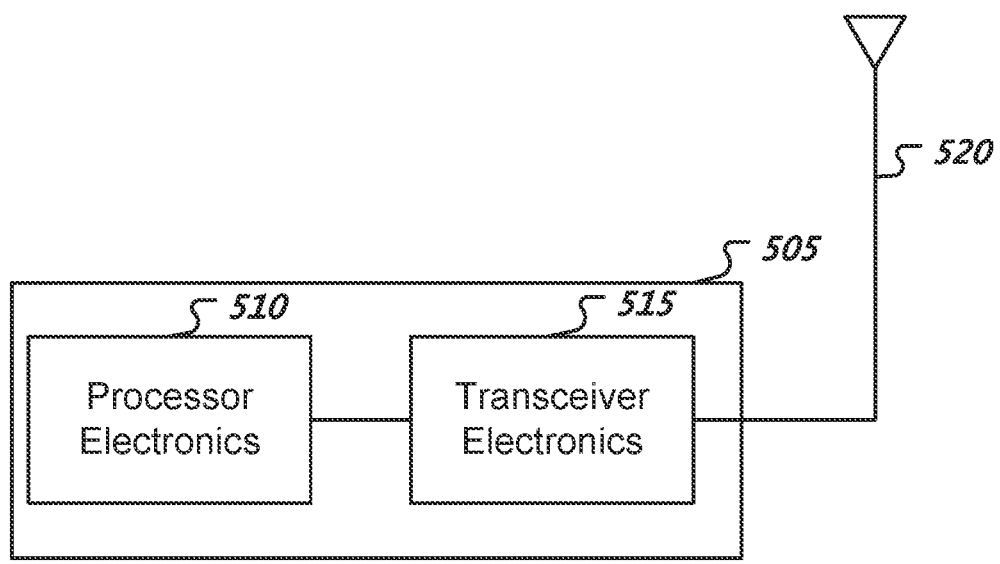
FIG. 5 is a block diagram representation of a portion of a hardware platform.

FIG. 5 is a block diagram representation of a portion of a hardware platform. A hardware platform 505 such as a network device or a base station or a wireless device (or UE) can include processor electronics 510 such as a microprocessor that implements one or more of the techniques presented in this document. The hardware platform 505 can include transceiver electronics 515 to send and/or receive wired or wireless signals over one or more communication interfaces such as antenna 520 or a wireline interface. The hardware platform 505 can implement other communication interfaces with defined protocols for transmitting and receiving data. The hardware platform 505 can include one or more memories (not explicitly shown) configured to store information such as data and/or instructions. In some implementations, the processor electronics 510 can include at least a portion of the transceiver electronics 515. In some embodiments, at least some of the disclosed techniques, modules or functions are implemented using the hardware platform 505.

Conclusion

From the foregoing, it will be appreciated that specific embodiments of the presently disclosed technology have been described herein for purposes of illustration, but that various modifications may be made without deviating from the scope of the invention. Accordingly, the presently disclosed technology is not limited except as by the appended claims.

The disclosed and other embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable sub combination. Moreover, although features may be described above as acting in certain combinations and even initially claimed as such, one or more features from a claimed combination can in some cases be excised from the combination, and the claimed combination may be directed to a sub combination or variation of a sub combination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described, and other implementations, enhancements and variations can be made based on what is described and illustrated in this patent document.

What is claimed is:

1. A method for wireless communication, comprising:
    receiving, by a terminal, control information for a first cell according to a rule that an amount of blind decoding resources for the first cell does not exceed a budget, wherein the budget comprises a physical downlink control channel (PDCCH) candidate budget and a non-overlapped control channel element (CCE) budget; and
    counting, by the terminal, the first cell only once to determine the budget in a case that the first cell is scheduled by the scheduling cell and the first cell is also scheduled by itself.

2. The method of claim 1, wherein the blind decoding resources include a number of candidates or non-overlapped control channel elements (CCEs) for physical downlink control channel (PDCCH) blind decoding.

3. The method of claim 1, wherein the first cell comprises one of a primary cell (PCell), a primary secondary cell group cell (PSCell), and a secondary cell (SCell).

4. The method of claim 1, wherein the rule further includes that a number of candidates for self-scheduling or a number of candidates for cross-carrier scheduling are separately configured for the first cell.

5. A terminal for wireless communication comprising a processor that is configured to carry out a method comprising:
    receiving, by the terminal on a scheduling cell, control information for a first cell according to a rule that an amount of blind decoding resources for the first cell does not exceed a budget, wherein the first cell is scheduled by the scheduling cell and the first cell is also scheduled by itself, wherein the budget comprises a physical downlink control channel (PDCCH) candidate budget and a non-overlapped control channel element (CCE) budget; and
    counting, by the terminal, the first cell only as one cell for determining the budget for scheduling the first cell from the first cell itself.

6. The terminal of claim 5, wherein the blind decoding resources includes a number of candidates or non-overlapped control channel elements (CCEs) for physical downlink control channel (PDCCH) blind decoding.

7. The terminal of claim 5, wherein the first cell comprises one of a primary cell (PCell), a primary secondary cell group cell (PSCell), and a secondary cell (SCell).

8. The terminal of claim 5, wherein the rule further includes that a number of candidates for self-scheduling and a number of candidates for cross-carrier scheduling are configured for the first cell.

9. The terminal of claim 8, wherein the number of candidates in a search space are configured for self-scheduling or cross-carrier scheduling.

10. A method for wireless communication, comprising:
    providing, by a scheduling cell implemented by a base station, to a terminal, control information for a first cell according to a rule that an amount of blind decoding resources for the first cell does not exceed a budget, wherein the first cell is scheduled by the scheduling cell and the first cell is also scheduled by itself, wherein the budget comprises a physical downlink control channel (PDCCH) candidate budget and a non-overlapped control channel element (CCE) budget, wherein the first cell is counted only as one cell for determining the budget for scheduling the first cell from the first cell itself.

11. The method of claim 10, wherein the blind decoding resources includes a number of candidates or non-overlapped control channel elements (CCEs) for physical downlink control channel (PDCCH) blind decoding.

12. The method of claim 10, wherein the first cell comprises one of a primary cell (PCell), a primary secondary cell group cell (PSCell), and a secondary cell (SCell).

13. The method of claim 10, wherein the rule further includes that a number of candidates for self-scheduling and a number of candidates for cross-carrier scheduling are configured for the first cell.

14. The method of claim 13, wherein the number of candidates in a search space are configured for self-scheduling or cross-carrier scheduling.

* * * * *